(12) United States Patent
Mackin

(10) Patent No.: US 11,046,442 B2
(45) Date of Patent: Jun. 29, 2021

(54) WEEPING FERROFLUID ANTI-ICE SYSTEM

(71) Applicant: THE BOEING COMPANY, Chicago, IL (US)

(72) Inventor: Steve G. Mackin, Bellevue, WA (US)

(73) Assignee: THE BOEING COMPANY, Chicago, IL (US)

(*) Notice: Subject to any disclaimer, the term of this patent is extended or adjusted under 35 U.S.C. 154(b) by 280 days.

(21) Appl. No.: 16/049,225

(22) Filed: Jul. 30, 2018

(65) Prior Publication Data

US 2018/0334255 A1 Nov. 22, 2018

Related U.S. Application Data

(62) Division of application No. 14/688,614, filed on Apr. 16, 2015, now Pat. No. 10,144,522.

(51) Int. Cl.
| | |
|---|---|
| H05B 6/10 | (2006.01) |
| B64D 15/00 | (2006.01) |
| B32B 33/00 | (2006.01) |
| B64D 15/08 | (2006.01) |
| B64D 15/22 | (2006.01) |
| B64D 15/12 | (2006.01) |
| B64D 33/02 | (2006.01) |

(52) U.S. Cl.
CPC ............ *B64D 15/08* (2013.01); *B64D 15/12* (2013.01); *B64D 15/22* (2013.01); *B64D 33/02* (2013.01); *B64D 2033/0233* (2013.01)

(58) Field of Classification Search
CPC ........ B64D 15/22; B64D 15/08; B64D 33/02; B64D 15/12; B64D 2033/0233
USPC ....... 219/628, 618, 635, 522, 543, 202, 528, 219/549, 480; 244/134 D, 134 R, 130, 244/204, 205; 315/111.21, 111.51, 315/111.41, 111.71; 428/141, 143
See application file for complete search history.

(56) References Cited

U.S. PATENT DOCUMENTS

| | | | | |
|---|---|---|---|---|
| 2,406,367 | A | | 8/1946 | Griffith et al. |
| 6,145,787 | A | * | 11/2000 | Rolls ................ F03D 1/065 244/134 R |
| 8,777,163 | B2 | | 7/2014 | Safai et al. |
| 10,144,522 | B2 | * | 12/2018 | Mackin ................ B64D 15/22 |
| 10,399,684 | B2 | * | 9/2019 | Hull ................ H05B 6/105 |
| 2013/0034695 | A1 | | 2/2013 | Smith et al. |

OTHER PUBLICATIONS

"TKS Panel Running," Published on Sep. 29, 2014, https://youtu.be/_Wtv_VwydeM [Accessed on Jun. 6, 2017].
"TKS Ice Protection System Natural De-Icing in Icing Wind Tunnel," Published on Oct. 22, 2014 [Accessed on Jun. 3, 2017].

(Continued)

*Primary Examiner* — Quang T Van
(74) *Attorney, Agent, or Firm* — Patterson + Sheridan, LLP

(57) ABSTRACT

Method, system, and aircraft for providing anti-ice protection including a supply of ferrofluid that is flowed out of orifices along a first region of an aerodynamic surface. The flowed ferrofluid is urged toward an aperture on a second region. The aperture is arranged relative to a magnetic field generator. A magnetic field generated by the magnetic field generator attracts the ferrofluid into the aperture while water droplets carried by the ferrofluid continue past the aperture.

20 Claims, 8 Drawing Sheets

(56) References Cited

OTHER PUBLICATIONS

"NACA 4415 flow visualization at low Reynolds numbers," Uploaded on Sep. 24, 2009 http://youtu.be/pdCTjPzCbCM [Accessed online Jun. 6, 2017].

"Innovating Ferrofluid for More Than 40 years," Ferrotec.com [Accessed online Jun. 6, 2017] https://ferrofluid.ferrotec.com/.

Liquids Research Limited www.liquidsresearch.co.uk [Accessed online Jun. 6, 2017].

"Amazing Ferrofluid experiment goes wrong," Published Jun. 7, 2013 hhtp://youtu.be/kmKMIBvdm9M?t=51s [Accessed on Jun. 6, 2017].

Ex Parte Quayle Office Action dated Mar. 15, 2018 for U.S. Appl. No. 14/688,614.

\* cited by examiner

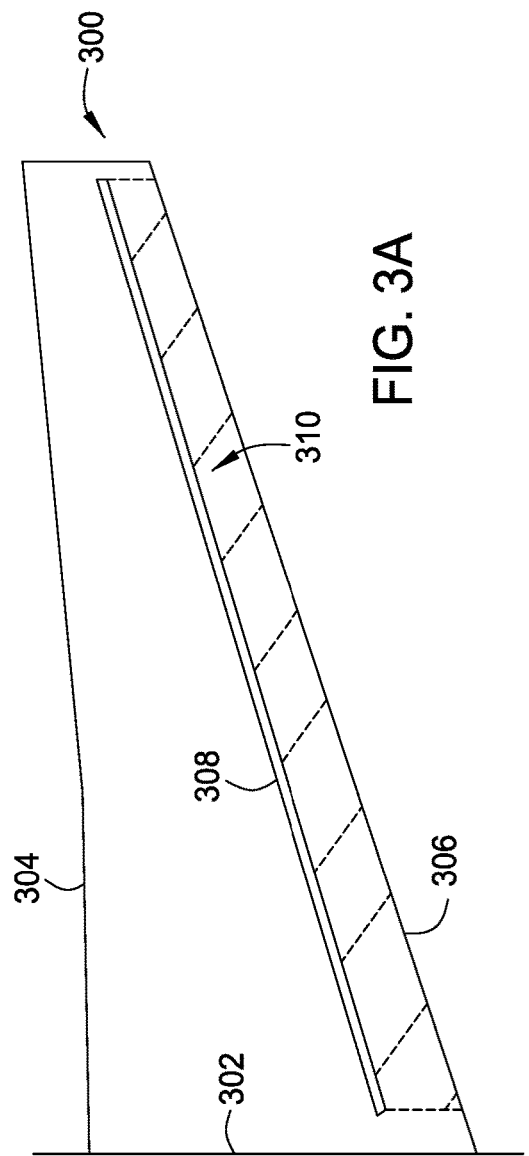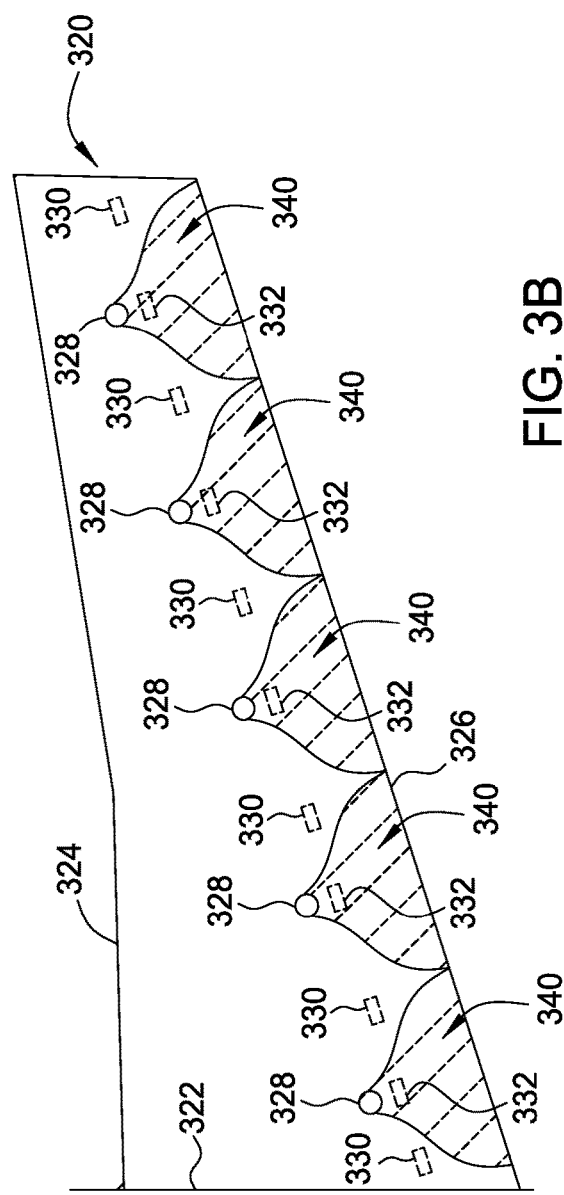

WEEPING FERROFLUID ANTI-ICE SYSTEM

CROSS-REFERENCE TO RELATED APPLICATIONS

This Application is a divisional of U.S. patent application Ser. No. 14/688,614, which was filed on Apr. 16, 2015 and issued on Dec. 4, 2018 as U.S. Pat. No. 10,144,522, and is herein incorporated by reference in its entirety.

BACKGROUND

The present invention relates to anti-ice systems, and more specifically, to anti-ice systems that recirculate a ferrofluid.

Ice buildup on aerodynamic surfaces of aircraft can be problematic. For example, ice can build up on the leading edges of wings and/or engine nacelles. The ice can add weight to the aircraft and affect the center of gravity of the aircraft. The ice can also disrupt the intended airflow over the aerodynamic surfaces, causing a loss of lift generated by the aerodynamic surface. A combination of design considerations of modern airfoils and modern certification requirements result in less ice tolerance, meaning that modern aircraft need to have more anti-ice capability than some conventional anti-icing technologies can provide. However, existing anti-ice technologies are complicated and/or expensive.

Generally, aircraft with on-board anti-ice or de-ice capability use one of three systems: bleed air systems, Tecalemit-Kilfrost-Sheepbridge (TKS) systems, and pneumatic/mechanical boots. Bleed air systems extract hot air from a compressor section of a gas turbine engine and direct the hot air to the leading edges of the wing and the engine inlet. Such bleed air systems require extensive ductwork and valves to direct the hot air and significant shielding to protect aircraft components in the event of a leak. TKS systems use a glycol-based fluid that is wept onto the leading edge of an airfoil, an engine nacelle, and/or a spinner for a propeller or fan. The glycol-based fluid mixes with water droplets, lowering the freezing point of the water droplets so that the water droplets cannot freeze. The mixture of glycol-based fluid and water droplets then flow off the aircraft together. The glycol-based fluid used by TKS systems can be very expensive. For example, one particular brand is currently available for over one hundred United States dollars for five gallons. Pneumatic/mechanical de-icing boots generally include a flexible and resilient material (e.g., rubber) that covers the leading edge of an airfoil and/or an engine nacelle. When a certain amount of ice accumulates, a pneumatic bladder behind the resilient material can be inflated and/or a mechanical actuator can be actuated, causing the resilient material to deform. The deformation causes any accumulated ice to break off and be shed into the airstream. The de-icing boots can be very effective for ice that has built up. However, as stated above, modern airfoil designs and/or certification requirements may only allow for less ice formation than a boot system can effectively remove.

SUMMARY

According to one aspect, a method for preventing ice from forming on a surface includes flowing a ferrofluid from a reservoir onto a first region of the surface, wherein ferrofluid on the first region flows to a second region. The method also includes generating a first magnetic field, wherein the first magnetic field is oriented toward an aperture in a second region of the surface, and wherein the magnetic field attracts the ferrofluid on the second region of the surface into the aperture. The method also includes flowing the ferrofluid from the aperture to the reservoir.

According to one aspect, an ice prevention system includes a reservoir containing a ferrofluid. The system also includes at least one orifice in fluid communication with the reservoir and arranged on a first region of an aerodynamic surface through which the ferrofluid can be flowed onto the first region of the aerodynamic surface, wherein ferrofluid on the first region flows to a second region. The system also includes at least one aperture arranged on the second region of the aerodynamic surface, wherein the aperture is in fluid communication with the reservoir. The system also includes a first magnetic field source arranged relative to the at least one aperture, wherein the magnetic field is oriented to attract ferrofluid that is proximate to the aperture on the second region of the aerodynamic surface into the aperture. The system also includes a pump in fluid communication with the reservoir, wherein the pump is configured to flow the ferrofluid from the at least one aperture to the reservoir and from the reservoir to the at least one orifice.

According to one aspect, an aircraft includes a reservoir containing a ferrofluid. The aircraft also includes a wing, wherein a leading edge surface of the wing includes a first plurality of orifices through which the ferrofluid can be flowed. The wing includes a first at least one aperture arranged on a downstream surface of the wing. The ferrofluid on the leading edge surface flows to the downstream region. The aircraft also includes at least one first magnetic field source arranged in the wing, wherein the first at least one magnetic field source is oriented to attract ferrofluid that is proximate to the first at least one aperture on the wing into the first at least one aperture. The aircraft also includes a pump in fluid communication with the reservoir. The pump is configured to flow the ferrofluid from the at least one aperture to the reservoir and from the reservoir to the plurality of orifices.

BRIEF DESCRIPTION OF THE SEVERAL VIEWS OF THE DRAWINGS

FIG. 3A is a top view of an airfoil for an aircraft with an anti-ice system according to various aspects;

FIG. 3B is a top view of an airfoil for an aircraft with an anti-ice system according to various aspects;

DETAILED DESCRIPTION

In the following, reference is made to particular aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In aspects described herein, a ferrofluid is wept onto a first region (e.g., an upstream region) of a surface (e.g., a leading edge of an airfoil, a leading edge of an engine nacelle inlet, or a forward portion of a propeller spinner). The ferrofluid is a fluid that becomes magnetized in the presence of a magnetic field. In various aspects, the ferrofluid is a colloidal liquid that includes ferromagnetic particles suspended in a fluid. In various instances, the ferromagnetic particles could be nanoscale in size (i.e., between one and one hundred nanometers). In various other instances, the ferromagnetic particles could be micrometer scale in size (e.g., one to one hundred micrometers). In the various aspects, the ferrofluid has a sufficiently low freezing point such that it does not freeze when it is dispersed over the surface. As the ferrofluid travels aft along the surface (due to moving air pushing the fluid and/or magnetic forces, discussed in greater detail below), the ferrofluid can mix with the water droplets in the air, preventing the water from freezing and/or carrying any freezing water droplets away from the leading edges. In various aspects, the ferrofluid can be hydrophobic. In such aspects, the hydrophobic ferrofluid can act as barrier, preventing water droplets from reaching the surface. Rather, the water droplets would float on top of the hydrophobic fluid. The ferrofluid (and any water droplets carried with the ferrofluid) eventually reaches one or more apertures in a downstream region of the surface. Magnetic field generators (i.e., magnetic field sources) arranged relative to the apertures generate magnetic fields that attract the ferrofluid into the apertures while the water droplets continue to be carried downstream. The ferrofluid can be recovered from the apertures and recirculated to the leading edge.

Figure 1:
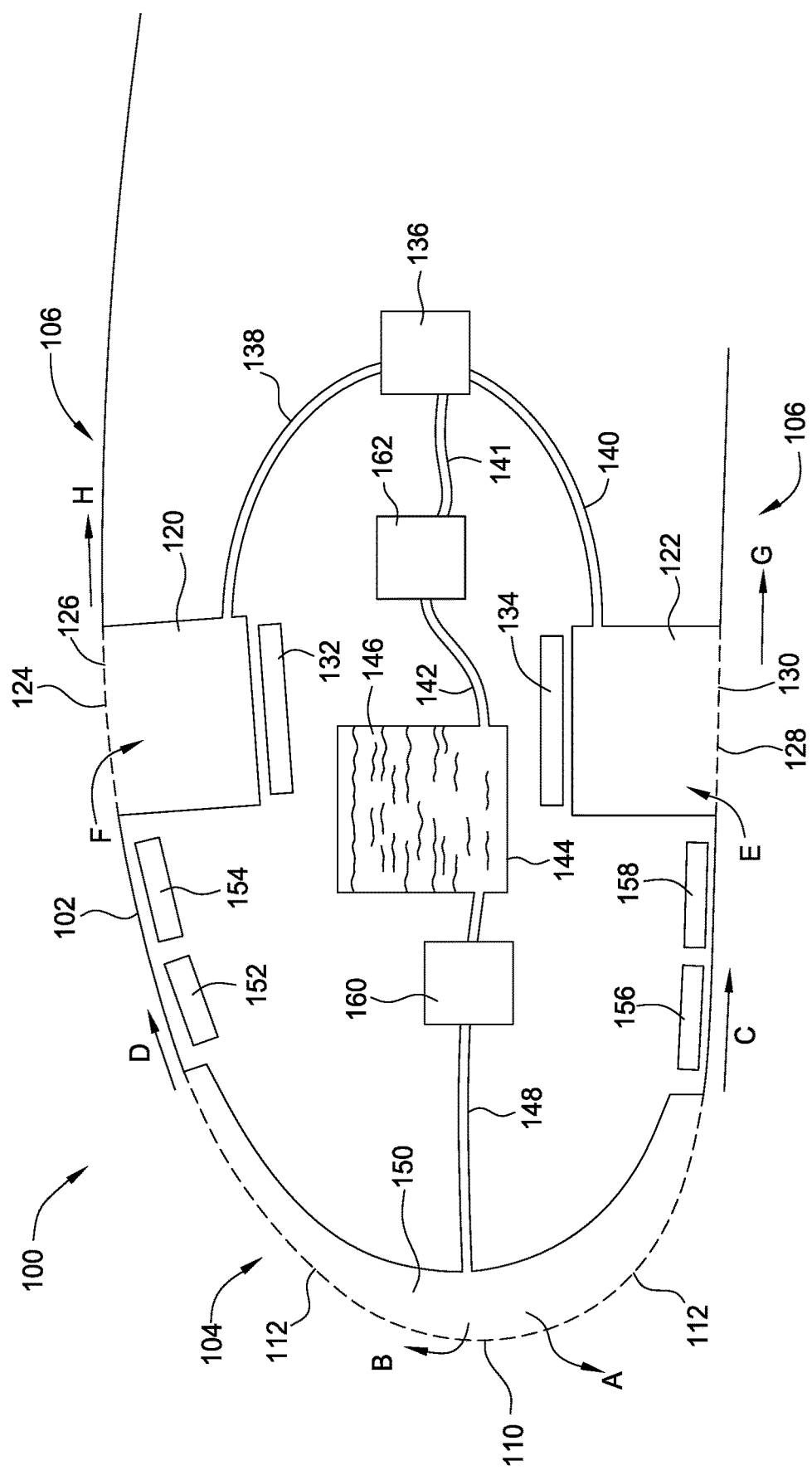
FIG. 1 is a cross-sectional schematic side view of a forward portion of an airfoil of an aircraft with an anti-ice system according to various aspects.

FIG. 1 is a cross-sectional schematic side view of the forward portion of a wing 100 of an aircraft. The wing 100 includes an aerodynamic surface 102 that generates lift for the aircraft. The wing 100 includes an upstream region 104 and a downstream region 106 aft of the upstream region 104. A leading edge panel 110 of the upstream region 104 can include an array of orifices 112 therethrough. In various aspects, the leading edge panel 110 could include eight hundred orifices 112 per square inch, wherein each orifice 112 has a diameter of approximately 0.0025 inches. In various other aspects, the sizes of the orifices and/or the number of orifices per given area could differ. The orifices 112 are in communication with a plenum 150 within the wing 100. The plenum 150 is in fluid communication with a reservoir 144 that contains a ferrofluid 146. The reservoir 144 is in communication with a pump 136 that can pump the ferrofluid 146 into the reservoir 144. In various aspects, the pump 136 could be a mechanical pump that mechanically moves the ferrofluid 146. In various other aspects, the pump 136 could be could be a ferrofluid pump that has no moving parts and uses electromagnetic fields to pump the ferrofluid 146 to the reservoir 144. The pumping by the pump 136 can also push the ferrofluid 146 from the reservoir 144 to the plenum 150. The ferrofluid 146 in the plenum 150 is then pumped out through the orifices 112 in the leading edge panel 110 of the wing 100 in the directions of arrows A and B. The direction in which the ferrofluid travels upon exiting a particular orifice 112 could depend on the orientation of the orifice 112 relative to a stagnation point on the wing 100 (i.e., the location on the wing 100 where impinging air splits to go above or below the wing 100). The ferrofluid 146 continues to travel aft along the wing 100 in the direction of arrows C and D. The ferrofluid 146 could be urged along the wing 100 in the directions of arrows C and D by air flowing over and under the wing 100. The ferrofluid 146 could also be urged along the wing 100 by magnetic field generators 152 and 156 arranged behind the aerodynamic surface 102 of the wing 100. The magnetic field generators 152 and 156 could be one or more permanent magnets and/or electromagnets. Magnetic fields generated by the magnetic field generators 152 and 156 could exert magnetic forces on the ferrofluid 146 moving along the aerodynamic surface 102 to urge the ferrofluid 146 in an aft direction and/or in a lateral direction.

The wing 100 includes a first aperture 120 along the top of a downstream region of the aerodynamic surface 102. The wing 100 also includes a second aperture 122 along the bottom of a downstream region of the aerodynamic surface 102. The first aperture 120 could include a baffle 124 that partially covers the first aperture 120. The baffle 124 could be continuous with the aerodynamic surface 102 of the wing 100 to provide a smooth transition for air traveling over the aerodynamic surface 102 and the baffle 124. The baffle 124 includes openings 126 therethrough. The second aperture 122 could also include a baffle 128 that partially covers the second aperture 122. The baffle 128 could be continuous with the aerodynamic surface 102 of the wing 100 to provide a smooth transition for air traveling over the aerodynamic surface 102 and the baffle 128. The baffle 128 includes openings 130 therethrough. The wing 100 includes magnetic field generators 132 and 134 arranged relative to the apertures 120 and 122, respectively. The magnetic field generators 132 and 134 could be permanent magnets or could be electromagnets. The magnetic field generators 132 and 134 can be oriented so that generated magnetic fields extend through the apertures 120 and 122, respectively. As indicated by arrows E and F, ferrofluid passing over the baffles 124 and 128 will be attracted by the generated magnetic fields and drawn into the apertures 120 and 122 through the openings 126 and 130 in the baffles 124 and 128, respectively. Water droplets may continue past the apertures 120 and 122 in the directions of arrows G and H. Ferrofluid that collects in the first aperture 120 can be drawn through a fluid conduit 138 to the pump 136. Ferrofluid 146 that collects in the second aperture 122 can be drawn through a fluid conduit 140 to the pump 136. Ferrofluid can then be pumped through fluid conduits 141 and 142 to the reservoir 144. As discussed above, the ferrofluid can be pumped from the reservoir 144 to the plenum 150 through a fluid conduit 148. When the ferrofluid 146 is not flowing, shutters could cover the openings 126 and 130 in the baffles 124 and 128, respectively.

In various aspects, a filter 162 can be arranged between the pump 136 and the reservoir 144. For example, the filter 162 could be arranged between fluid conduits 141 and 142. The filter 162 could remove any contaminants, such as water, from the ferrofluid 146. The filter could be connected to a drain line that can dump accumulated water and other contaminants overboard. In various aspects, the wing is provisioned with one or more heating elements operable to heat the ferrofluid 146. Heating the ferrofluid may assist in preventing water droplets from freezing on the aerodynamic surface 102 of the wing. In addition, thermally controlling the ferrofluid may allow the viscosity of the ferrofluid to be adjusted to a desired level. In one aspect, a heater 160 is arranged between the reservoir 144 and the plenum 150 so that the heater 160 can heat the ferrofluid 146 flowing to the plenum 150. In addition or in the alternative, the wing 100 includes induction coils 154 and 158 that can heat the ferrofluid 146 traveling along the aerodynamic surface 102 of the wing 100 in the directions of arrows D and C.

Figure 2A:
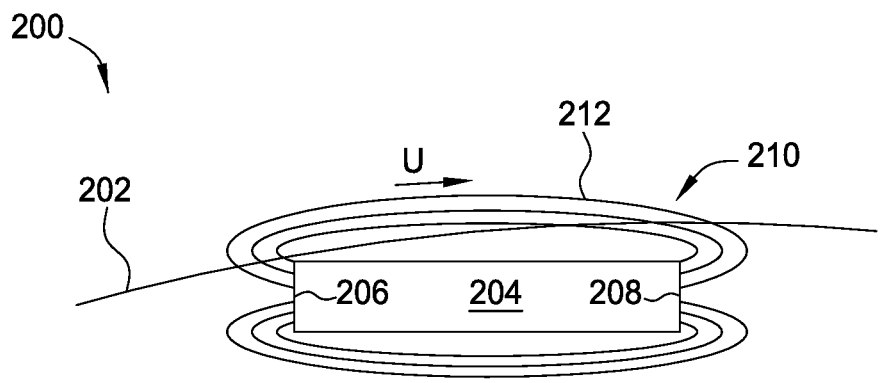
FIG. 2A is a schematic cross-sectional side view of a magnetic field generator arranged under an aerodynamic surface such that magnetic field lines generated by the magnetic field generator are parallel to the aerodynamic surface.
Figure 2B:
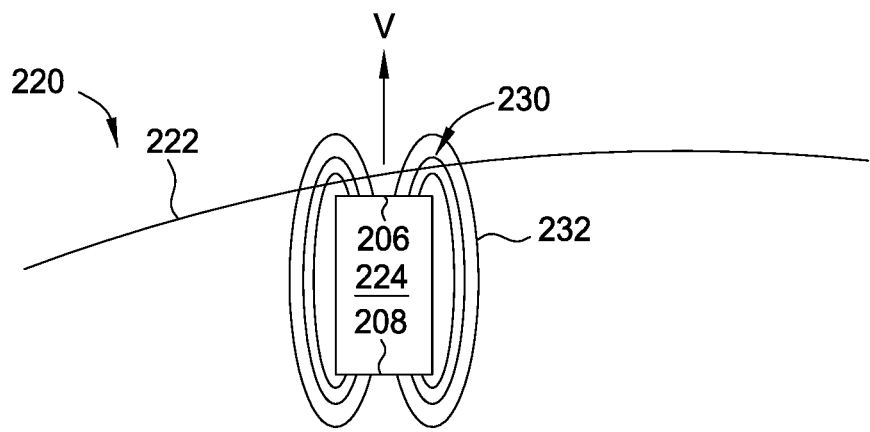
FIG. 2B is a schematic cross-sectional side view of a magnetic field generator arranged under an aerodynamic surface such that magnetic field lines generated by the magnetic field generator are perpendicular to the aerodynamic surface.
Figure 2C:
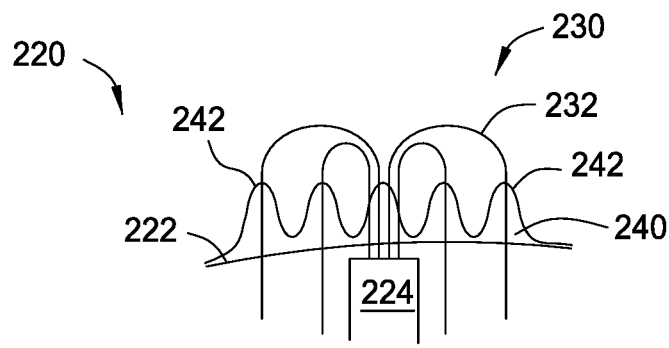
FIG. 2C is a cross-sectional side view of the magnetic field generator of FIG. 2B with a ferrofluid on the aerodynamic surface that is reacting to the magnetic field generated by the magnetic field generator.

As discussed above, magnetic field generators 152 and 156 could be arranged relative to the aerodynamic surface 102 of the wing 100 to urge the ferrofluid 146 in a particular direction. Referring now to FIG. 2A, a magnetic field generator 204 (e.g., a permanent magnet or an electromagnet) is arranged behind an aerodynamic surface 202 and is oriented with its poles 206 and 208 substantially parallel to the aerodynamic surface 202. The magnetic field generator 204 generates a magnetic field 210 with magnetic field lines 212 that are substantially parallel to the aerodynamic surface 202. As a result, ferrofluid traveling along the aerodynamic surface 202 is urged by the magnetic field 210 in the direction arrow U. FIG. 2B illustrates a magnetic field generator 224 (e.g., a permanent magnet or an electromagnet) that is arranged behind an aerodynamic surface 222 and that is oriented with its poles 226 and 228 substantially perpendicular to the aerodynamic surface 222. The magnetic field generator 224 generates a magnetic field 230 with magnetic field lines 232 that are substantially perpendicular to the aerodynamic surface 222. As a result, ferrofluid traveling along the aerodynamic surface 202 proximate to the magnetic field generator 224 can be urged away from the aerodynamic surface in the direction of arrow V. FIG. 2C illustrates ferrofluid 240 being urged away from the aerodynamic surface 222. Peaks 242 can form in the ferrofluid 240 as the ferrofluid 240 is urged by the magnetic field lines 232. Such peaks 242 in the ferrofluid 240 could disrupt any ice formation on a surface of the ferrofluid 240, causing the ice to break apart.

Figure 2D:
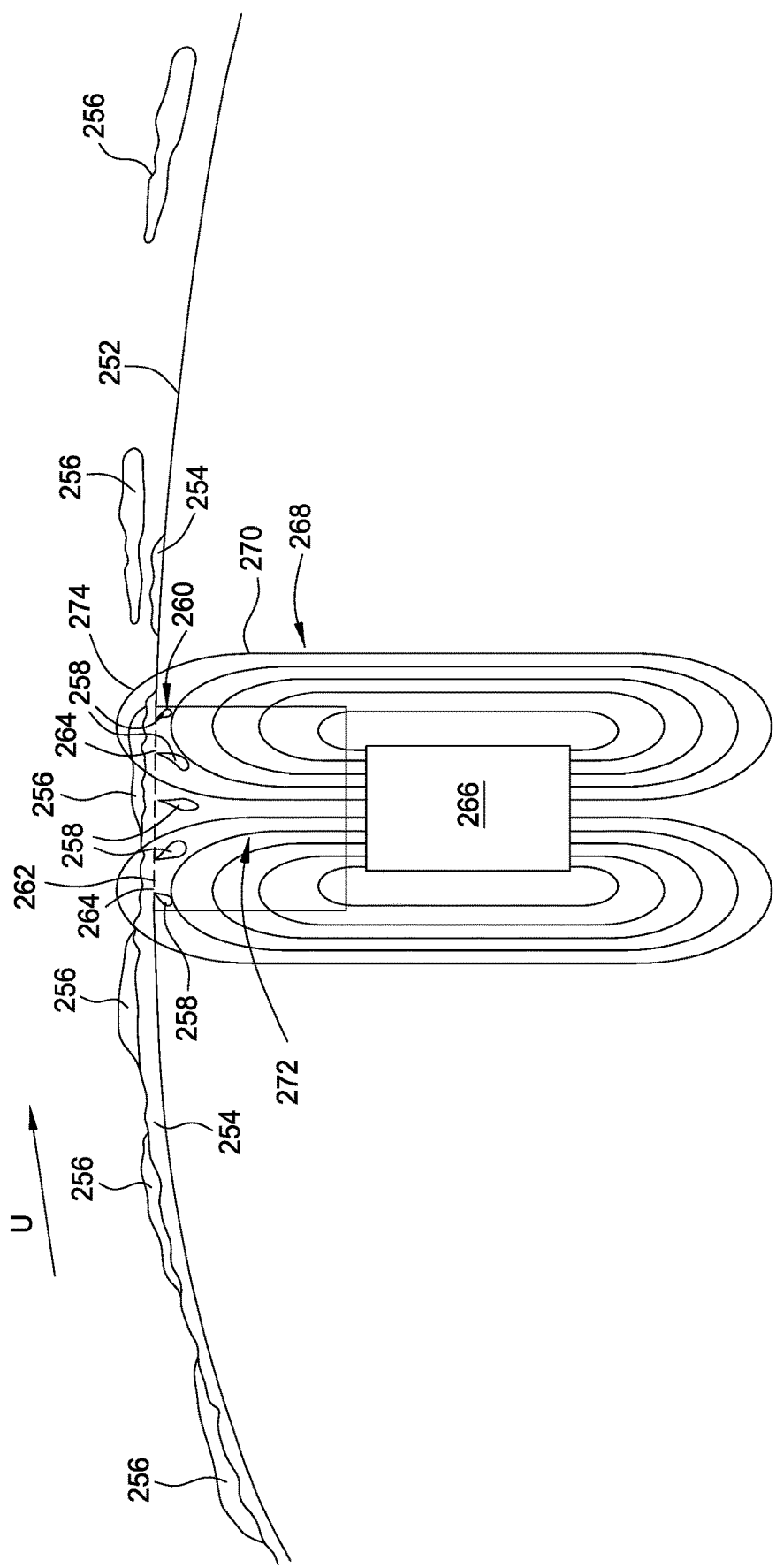
FIG. 2D is a cross-sectional side view of a magnetic field generator arranged relative to an aperture in an aerodynamic surface, wherein the magnetic field generator is oriented such that magnetic field lines of a magnetic field lines are positioned in the aperture.

FIG. 2D illustrates a detail view of an aperture 260 in an aerodynamic surface 252. Similar to the apertures 120 and 122 shown in FIG. 1, the aperture 260 includes a baffle 262 with openings 264 therethrough. The baffle 262 can provide a surface that is nearly continuous with the aerodynamic surface 252 so that air flowing over the aerodynamic surface 252 (in the direction of arrow U) is disturbed as little as possible. A magnetic field generator 266 (e.g., a permanent magnet and/or an electromagnet) is arranged under the aerodynamic surface and relative to the aperture 260 such that at least a portion of the magnetic field 268 generated by the magnetic field generator 266 is oriented toward the aperture 260. FIG. 2D show magnetic field lines 270 of the magnetic field 268 passing into the aperture 260. In various aspects, as shown in FIG. 2D, some of the magnetic field lines 270 (e.g., magnetic field line 274) extend past the aerodynamic surface 252. As shown in FIG. 2D, a dense magnetic field region 272 of the magnetic field lines 270 (i.e., where the magnetic field 268 is the strongest) may be positioned in the aperture 260.

FIG. 2D also illustrates a ferrofluid 254 on the aerodynamic surface 252. The ferrofluid 254 can be urged toward the aperture 260 by the air flowing over the aerodynamic surface 252 and/or by magnetic fields generated by other magnetic field generators (e.g., magnetic field generators 152 and 156 shown in FIG. 1). The ferrofluid 254 can carry water droplets 256 that would otherwise impinge on the aerodynamic surface 252 (e.g., super cooled water droplets in the atmosphere that could freeze upon contact with the aerodynamic surface 252). As discussed above, in various aspects, the water droplets 256 may be intermixed with the ferrofluid 254. In various other aspects, the ferrofluid 254 can comprise a hydrophobic fluid, which repels the water droplets. In such aspects, the water droplets may sit on top of the ferrofluid 254 (rather than intermix with the ferrofluid 254). The ferrofluid 254 and water droplets 256 move toward the aperture 260 in the direction of arrow U. When the ferrofluid 254 and the water droplets 256 reach the baffle 262 over the aperture 260, the ferrofluid 254 is urged toward the aperture 260 by the magnetic field 268. The ferrofluid 254 can pass through the openings 264 in the baffle 262 to enter the aperture 260 (as indicated by droplets 258 entering the aperture 260). The water droplets 256, which are not attracted by the magnetic field 268, can pass along the baffle 262 and continue downstream of the aperture 260.

A certain amount of water 256 may enter the aperture 260. As discussed above, various aspects of an anti-ice system could include a filter (e.g., filter 162 shown in FIG. 1) to remove water and/or other contaminants that could enter the aperture 260. As shown in FIG. 2D, a certain amount of ferrofluid 254 may not be pulled into the apertures 260 by the magnetic field 268. Instead, such ferrofluid 254 may continue downstream along the aerodynamic surface 252 and be lost. In various circumstances, the ferrofluid 254 can be treated as a consumable, wherein a certain amount of loss of ferrofluid 254 could be acceptable. When such circumstances occur, ferrofluid 254 can be added to a reservoir (e.g., the reservoir 144 shown in FIG. 1) to replace the consumed ferrofluid 254.

FIGS. 3A and 3B illustrate two configurations for apertures on wings according to various aspects. FIG. 3A illustrates a portion of an aircraft 300 that includes a fuselage 302 and a wing 304 extending from the fuselage 302. A leading edge 306 of the wing 304 includes orifices, such as orifices 112 shown in FIG. 1, through which a ferrofluid can weep out. The wing 304 also includes an aperture 308 running along almost the entire span of the wing 304. During flight, ferrofluid weeping from the leading edge 306 of the wing 304 is urged rearward toward the aperture 308 by air passing by the wing 304. The region 310 denoted by dashed lines indicates an area of the wing 304 covered by ferrofluid as the ferrofluid travels from the leading edge 306 to the aperture 308.

FIG. 3B illustrates a portion of an aircraft 320 that includes a fuselage 322 and a wing 324 extending from the fuselage 322. A leading edge 326 of the wing 324 includes orifices, such as orifices 112 shown in FIG. 1, through which a ferrofluid can weep out. The wing 324 includes a plurality of apertures 328 spaced apart along span of the wing 324. The wing 324 also includes a plurality of first magnetic field generators 330 and a plurality of second magnetic field generators 332 arranged inside of the wing 324 (i.e., beneath an aerodynamic surface of the wing 324). The plurality of first magnetic field generators 330 are spaced between the apertures 328 and are oriented to repel the ferrofluid. The plurality of second magnetic field generators 332 are substantially aligned with the apertures 328 and are oriented to attract the ferrofluid. During flight, ferrofluid weeping from the leading edge 326 of the wing 325 is urged rearward by air passing over the wing 324. The ferrofluid is also urged laterally by the magnetic fields of the magnetic field generators 330 and 332. Specifically, the ferrofluid is urged toward the plurality of second magnetic field generators 332 and away from the plurality of first magnetic field generators 330. The regions 340 denoted by dashed lines indicate areas of the wing 324 covered by ferrofluid. As the ferrofluid travels from the leading edge 326, the ferrofluid is laterally steered toward the apertures 328 by the attractive magnetic fields of the plurality of second magnetic field generators 332 and the repulsive magnetic fields of the plurality of first magnetic field generators 330.

Figure 4:
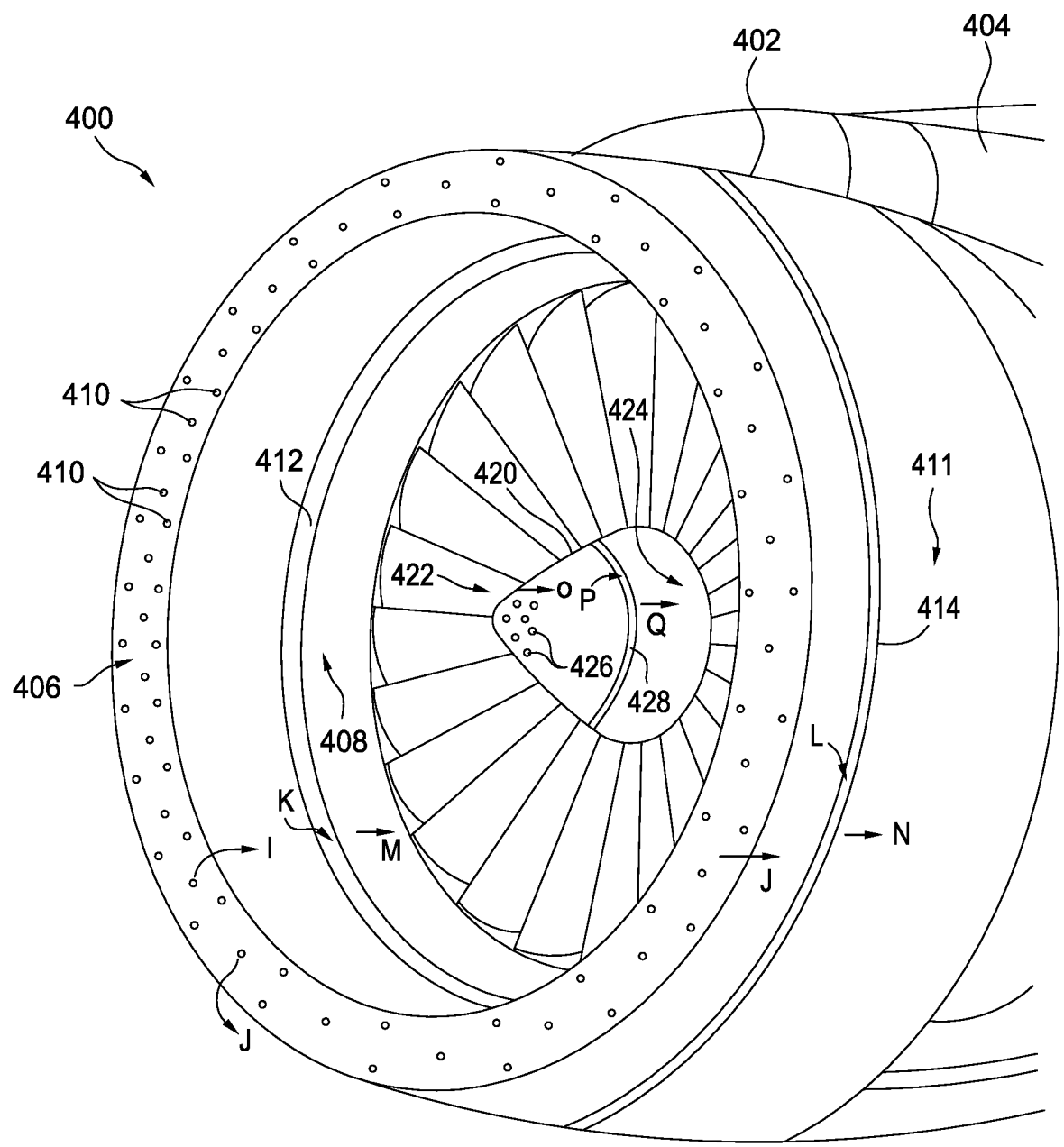
FIG. 4 is a front perspective view of a gas turbine engine and an engine nacelle with an anti-ice system according to various aspects.

FIG. 4 illustrates an anti-ice system according to various aspects on a gas turbine engine 400. The gas turbine engine includes a nacelle 402 mounted on a pylon 404. The pylon 404 could connect the nacelle 402 to a wing or fuselage of an aircraft, for example. The nacelle 402 includes a leading edge 406. The leading edge 406 includes a plurality of orifices 410, such as orifices 112 shown in FIG. 1, through which a ferrofluid can weep out. The ferrofluid weeping out of the orifices 410 can travel in the direction of arrow I toward an inward-facing downstream surface 408 of the nacelle 402 or in the direction of arrow J toward an outward-facing downstream surface 411 of the nacelle 402. The inward-facing downstream surface 408 of the nacelle 402 includes an aperture 412, similar to aperture 120 or aperture 122 shown in FIG. 1. The aperture 412 could be arranged as a continuous aperture (similar to the aperture 308 shown in FIG. 3A) or as a series of spaced-apart apertures (similar to the apertures 328 shown in FIG. 3B). Ferrofluid traveling toward the aperture 412 can be drawn into the aperture 412 in the direction of arrow K and water carried by the ferrofluid can continue into the engine in the direction of arrow M. The outward-facing downstream surface 411 of the nacelle 402 includes an aperture 414, similar to aperture 120 or aperture 122 shown in FIG. 1. The aperture 414 could be arranged as a continuous aperture (similar to the aperture 308 shown in FIG. 3A) or as a series of spaced-apart apertures (similar to the apertures 328 shown in FIG. 3B). Ferrofluid traveling toward the aperture 414 can be drawn into the aperture 414 in the direction of arrow L and water carried by the ferrofluid can continue aft in the direction of arrow N.

A spinner 420 for the gas turbine engine 400 can also include an anti-ice system. An array of orifices 426, such as orifices 112 shown in FIG. 1, can be arranged on a first region 422 (e.g., an upstream region) of the spinner 420. An aperture 428, similar to aperture 120 or aperture 122 shown in FIG. 1, can be arranged on a second region 424 (e.g., a downstream region) of the spinner 420. The aperture 428 could be arranged as a continuous aperture (similar to the aperture 308 shown in FIG. 3A) or as a series of spaced-apart apertures (similar to the apertures 328 shown in FIG. 3B). Ferrofluid traveling from the orifices 426 (in the direction of arrow O) toward the aperture 428 can be drawn into the aperture 428 in the direction of arrow P and water carried by the ferrofluid can continue into the engine in the direction of arrow Q.

Figure 5:
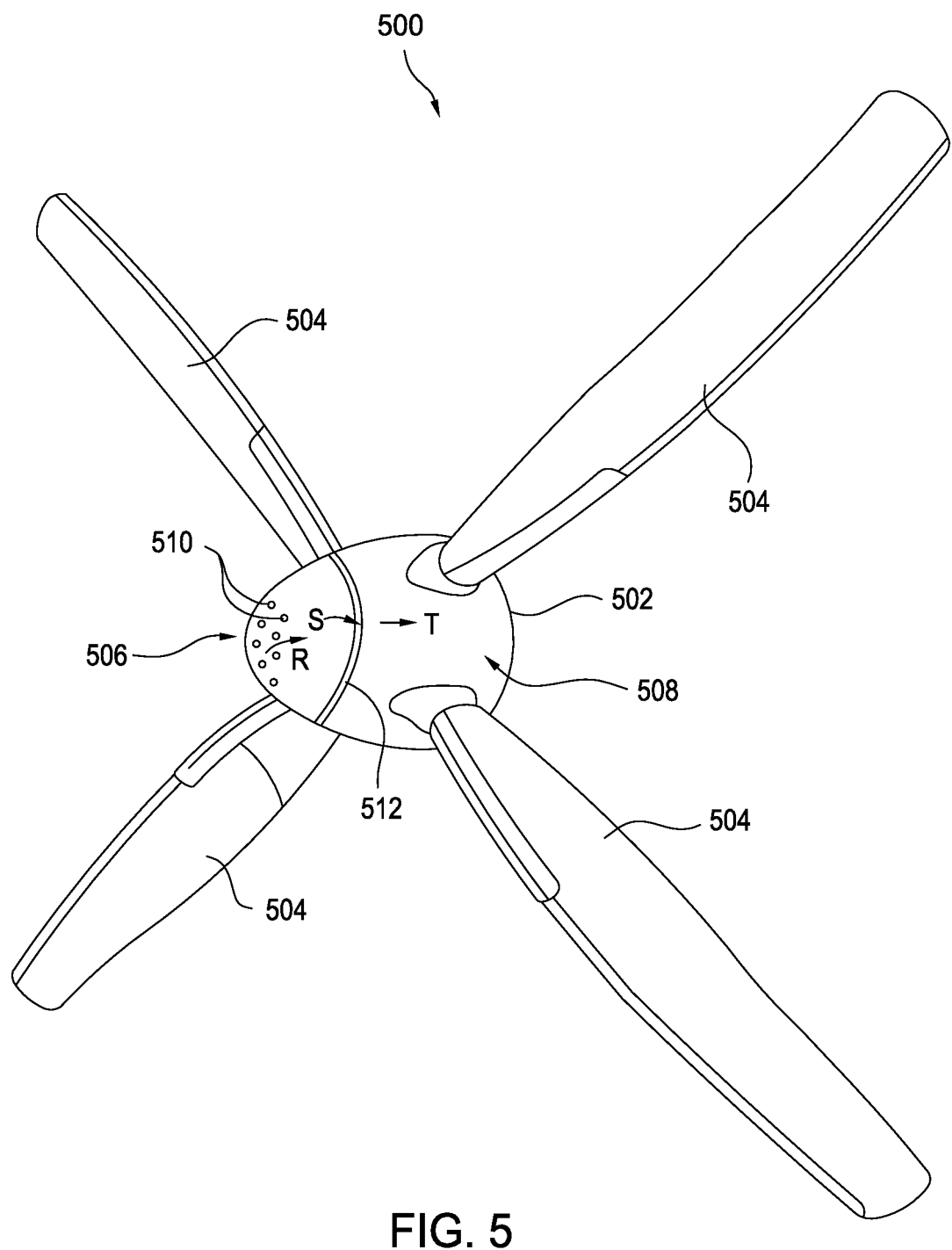
FIG. 5 is a front perspective view of a propeller and propeller spinner with an anti-ice system according to various aspects.

FIG. 5 illustrates an anti-ice system according to various aspects on an aircraft propeller 500. The propeller includes four propeller blades 504 extending from a spinner 502. An anti-ice system can be arranged for the spinner 502. An array of orifices 510, such as orifices 112 shown in FIG. 1, can be arranged on a first region 506 (e.g., an upstream region) of the spinner 502. An aperture 512, similar to aperture 120 or aperture 122 shown in FIG. 1, can be arranged on a second region 508 (e.g., a downstream region) of the spinner 502. The aperture 512 could be arranged as a continuous aperture (similar to the aperture 308 shown in FIG. 3A) or as a series of spaced-apart apertures (similar to the apertures 328 shown in FIG. 3B). Ferrofluid traveling from the orifices 510 (in the direction of arrow R) toward the aperture 512 can be drawn into the aperture 512 in the direction of arrow S and water carried by the ferrofluid can continue toward the blades 504 the direction of arrow T.

Figure 6:
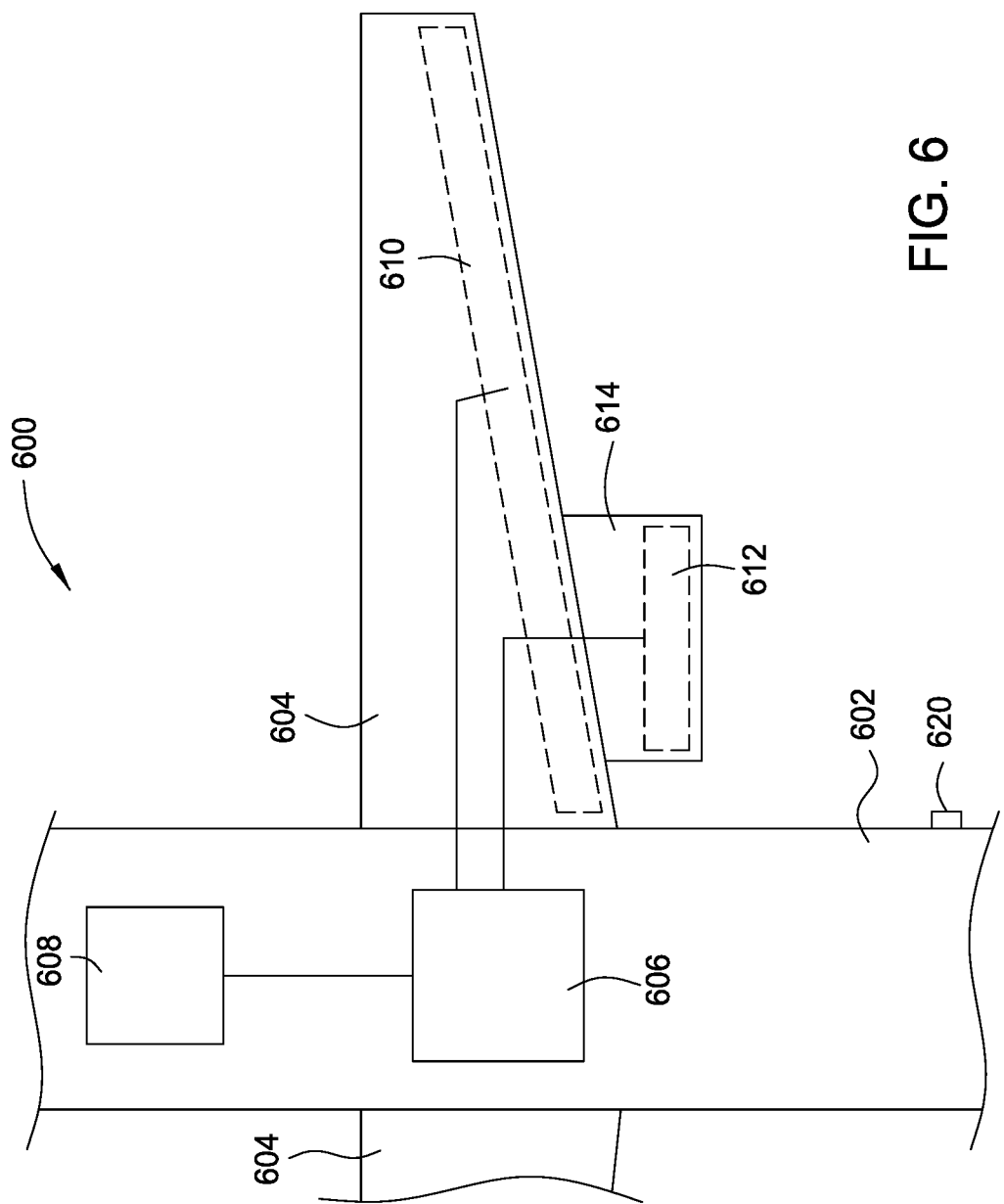
FIG. 6 is a top schematic view of an aircraft with an anti-ice system according to various aspects.

In various aspects, the ferrofluid used for anti-ice could also be used by other aircraft systems. For example, the ferrofluid could be used by a hydraulic system onboard the aircraft and/or by a cooling system onboard the aircraft. For example, a hydraulic system may be used to power aircraft control surfaces (e.g., ailerons, elevator, rudder, spoilers, and flaps) or landing gear actuation. The ferrofluid could be used as hydraulic fluid. As another example, cooling systems are used to extract heat from avionics and/or to provide refrigeration to galley refrigerators. The ferrofluid could be used to carry heat away from such avionics or refrigerators. FIG. 6 is a schematic view of an aircraft 600, illustrating a portion of the fuselage 602 and the wings 604 of the aircraft 600. The aircraft includes a reservoir 606 of ferrofluid. The ferrofluid can be provided to an anti-ice system 610 in the wings 604 of the aircraft 600 and to an anti-ice system 612 in engines 614 of the aircraft 600. The anti-ice system 610 in the wings 604 could draw ferrofluid from the reservoir 606, pass the ferrofluid through orifices in a leading edge of the wing, recover at least some of the ferrofluid through apertures in a downstream region of the wing, and return the ferrofluid to the reservoir 606. Similarly, the anti-ice system 612 in the engines 615 could draw ferrofluid from the reservoir 606, pass the ferrofluid through orifices in a leading edge of the engine nacelle (and a spinner), recover at least some of the ferrofluid through apertures in a downstream region of the nacelle (and the spinner), and return the ferrofluid to the reservoir 606. The reservoir 606 can also be in fluid communication with other systems 608 onboard the aircraft, such as a hydraulic system or cooling system, described above. The other systems 608 could circulate ferrofluid to and from the reservoir 606 for use.

In various aspects, the aircraft 600 could include an icing detector 620. The icing detector 620 could be a sensor that detects the buildup of ice thereon and/or that detects atmospheric conditions (e.g., temperature and humidity levels) in which icing conditions are possible. The anti-ice systems described herein according to various aspects have a minimal impact on aircraft performance (e.g., they do not detract from engine power). Thus, in various aspects, computer systems onboard the aircraft 600 could monitor the icing detector 620 and automatically activate the anti-icing systems 610 and 612 if icing and/or icing conditions are detected.

Figure 7:
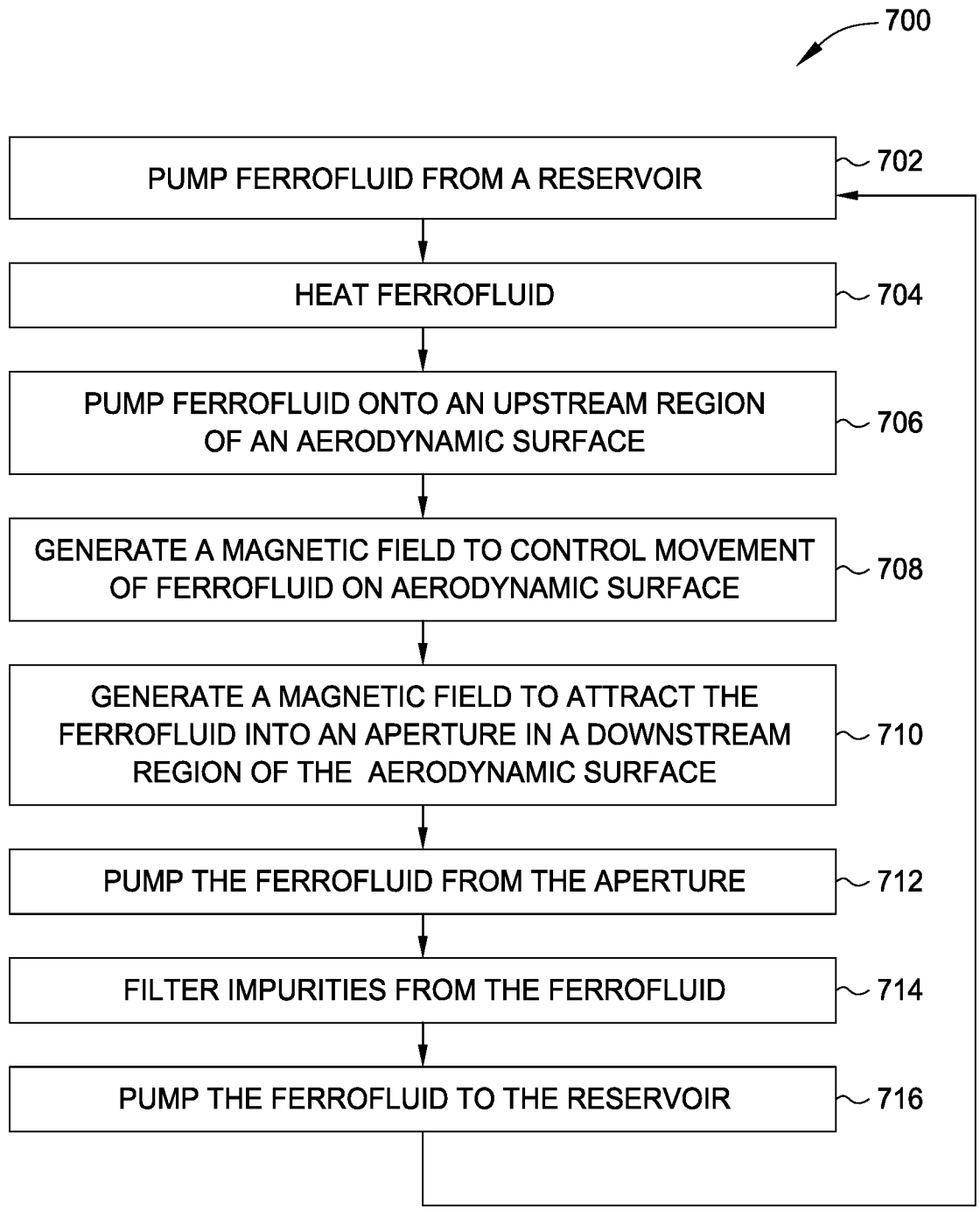
FIG. 7 is a flow chart for a method for using an anti-ice system according to various aspects.

FIG. 7 is a flow chart that illustrates a method 700 for operating an anti-ice system. In block 702, ferrofluid is pumped from a reservoir. Optionally, in block 704, the ferrofluid can be heated. In block 706, the ferrofluid is pumped onto a first region (e.g., an upstream region) of an aerodynamic surface. For example, the ferrofluid could be pumped through orifices onto a leading edge surface of a wing and/or an engine nacelle. As another example, the ferrofluid could be pumped onto an upstream surface of a spinner for a gas turbine engine or a propeller. Optionally, in block 708, a magnetic field can be generated relative to the aerodynamic surface to direct flow of the ferrofluid along the surface or relative to the surface. For example, magnetic field generators (e.g., permanent magnets and/or electromagnets) could be arranged beneath the aerodynamic surface to provide the magnetic field. The magnetic field generator could be oriented such that its magnetic field is oriented parallel or perpendicular to the aerodynamic surface to direct the ferrofluid along the aerodynamic surface, away from the aerodynamic surface, or toward the aerodynamic surface. In block 710, a magnetic field is generated in an aperture in a second region (e.g., a downstream region) of the aerodynamic surface. The magnetic field is oriented to attract the ferrofluid into the aperture. In block 712, the ferrofluid is pumped from the reservoir. In block 714, the ferrofluid is optionally filtered to remove impurities, such as water, dust, or the like. In block 716, the ferrofluid is returned to the reservoir. When the system is turned off, shutters or the like could cover the apertures.

Various aspects described herein could be arranged on other surfaces, such as antenna or instruments. For example, certain aircraft include various antennas that extend away from the fuselage. A ferrofluid could be flowed through one or more orifices at a base of an antenna and collected through one or more apertures at or near the tip of the antenna. Alternatively, a ferrofluid could be flowed through one or more orifices at a tip of an antenna and collected through one or more apertures at or near the base of the antenna.

Other aspects may also be used to prevent ice accumulation on cold, condensing surfaces where atmospheric air cause ice formation, such as on terrestrial auxiliary heat exchangers used in nitrogen recovery systems and cryogenic fuel tanks such as those used on launch vehicles.

In various instances, the ferrofluid systems described above could be activated in non-icing conditions. For example, aircraft sometimes impact flying insects when flying at low altitudes (e.g., during the takeoff, climb, descent, and landing phases of a flight). Cumulative insect impacts could result in a buildup of insect debris on the leading edge surface of the wings, engines, etc. In addition to being unsightly, a significant accumulation of insect debris could have an impact on aerodynamic performance. Thus, aircraft are periodically cleaned to remove such debris. In certain circumstances, a coating of ferrofluid on the aerodynamic surfaces could prevent insects from reaching the underlying aerodynamic surface and/or could prevent any insect debris from sticking to the aerodynamic surface. As an example, the pilots of an aircraft departing from an airport in a region with a lot of mosquitos could activate a ferrofluid system before takeoff to reduce the amount of insect debris that would accumulate on the wings, engines, etc. due to impacts with mosquitos. Other possible uses for aspects of a ferrofluid would be dusty conditions, smoky conditions, or the like.

In the above-described aspects, anti-ice systems operate with a small engine performance penalty (e.g., compared to an engine bleed anti-ice system). The above-described anti-ice systems are also capable of operating continuously (e.g., compared to the inflatable boot system). Furthermore, the above-described systems operate with the small engine performance penalty and continuous operation without consuming significant quantities of sometimes-expensive anti-ice fluid.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to aspects of the present invention, other and further aspects of the invention may be devised without departing from the basic scope thereof, and the scope thereof is determined by the claims that follow.

What is claimed is:

1. A method for preventing ice from forming on an aerodynamic surface of an aircraft, the method comprising:
   flowing a ferrofluid from a reservoir through a first plurality of orifices onto an upstream region of the aerodynamic surface using a pump, wherein the first plurality of orifices are on a leading edge of the aerodynamic surface, and wherein ferrofluid on the upstream region flows to a downstream region of the aerodynamic surface;
   generating a first magnetic field using at least one first magnetic field source, wherein the first magnetic field is oriented toward an aperture in the downstream region of the aerodynamic surface, and wherein the first magnetic field attracts the ferrofluid on the downstream region of the aerodynamic surface into the aperture; and
   flowing the ferrofluid from the aperture to the reservoir using the pump.

2. The method of claim 1, further comprising heating the ferrofluid before flowing the ferrofluid from the reservoir onto the upstream region of the aerodynamic surface.

3. The method of claim 1, further comprising heating the ferrofluid on the aerodynamic surface through induction heating.

4. The method of claim 1, further comprising generating a second magnetic field, wherein the second magnetic field is arranged relative to the aerodynamic surface, and wherein the second magnetic field directs movement of the ferrofluid on the aerodynamic surface from the upstream region to the downstream region.

5. The method of claim 1, further comprising filtering the ferrofluid before flowing the ferrofluid back to the reservoir.

6. The method of claim 1, further comprising:
   ceasing flowing of the ferrofluid onto the upstream region of the aerodynamic surface; and
   after the flowing has ceased, closing a shutter over the aperture in the downstream region of the aerodynamic surface.

7. The method of claim 1, wherein the ferrofluid comprises nanometer-sized magnetic particles.

8. The method of claim 1, wherein the ferrofluid comprises a hydrophobic fluid.

9. The method of claim 1, wherein the aerodynamic surface is at least one of an airfoil, an engine nacelle inlet, or a propeller spinner.

10. An aircraft, comprising:
a reservoir containing a ferrofluid;
a wing, wherein a leading edge surface of the wing includes a first plurality of orifices through which the ferrofluid can be flowed, wherein the wing includes a first at least one aperture arranged on a downstream region of the wing, wherein the ferrofluid on the leading edge surface flows to the downstream region;
at least one first magnetic field source arranged in the wing, wherein the first at least one magnetic field source is oriented to attract ferrofluid that is proximate to the first at least one aperture on the wing into the first at least one aperture; and
a pump in fluid communication with the reservoir, wherein the pump is configured to flow the ferrofluid from the first at least one aperture to the reservoir and from the reservoir to the first plurality of orifices.

11. The aircraft of claim 10, further comprising:
an engine, wherein the engine includes a second aerodynamic surface, wherein the second aerodynamic surface includes a second plurality of orifices on an upstream region through which the ferrofluid can be flowed onto the second aerodynamic surface from the reservoir, wherein the second aerodynamic surface includes a second at least one aperture in fluid communication with the reservoir, and wherein the ferrofluid flows from the upstream region to the downstream region;
a second at least one magnetic field source arranged in the engine, wherein the second at least one magnetic field source is oriented to attract ferrofluid that is proximate to the second at least one aperture on the second aerodynamic surface into the second at least one aperture; and
wherein the pump is configured to flow the ferrofluid from the second at least one aperture to the reservoir and from the reservoir to the second plurality of orifices.

12. The aircraft of claim 10, wherein the aircraft includes an icing detector, and wherein the aircraft automatically activates the pump upon the icing detector detecting icing conditions.

13. The aircraft of claim 10, wherein the reservoir is further in fluid communication with at least one of a hydraulic system and a cooling system onboard the aircraft, and wherein the ferrofluid is used by at least one of the hydraulic system and the cooling system.

14. The aircraft of claim 13, further comprising a filter arranged between the first at least one aperture and the reservoir, wherein the filter removes contaminants from the ferrofluid.

15. The aircraft of claim 10, wherein the ferrofluid comprises nanometer-sized magnetic particles.

16. The aircraft of claim 10, wherein the ferrofluid comprises a hydrophobic fluid.

17. An aircraft, comprising:
a reservoir containing a ferrofluid;
an aerodynamic surface, wherein a leading edge of the aerodynamic surface includes a first plurality of orifices through which the ferrofluid can be flowed, wherein the aerodynamic surface includes a first at least one aperture arranged on a downstream region of the aerodynamic surface, wherein the ferrofluid on the leading edge flows to the downstream region;
at least one first magnetic field source arranged in the aerodynamic surface, wherein the first at least one magnetic field source is oriented to attract ferrofluid that is proximate to the first at least one aperture on the aerodynamic surface into the first at least one aperture; and
a pump in fluid communication with the reservoir, wherein the pump is configured to flow the ferrofluid from the first at least one aperture to the reservoir and from the reservoir to the first plurality of orifices.

18. The aircraft of claim 17, wherein the aerodynamic surface is an airfoil.

19. The aircraft of claim 17, wherein the aerodynamic surface is an engine nacelle inlet.

20. The aircraft of claim 17, wherein the aerodynamic surface is a propeller spinner.

* * * * *